United States Patent [19]
Satoh et al.

[11] Patent Number: 5,530,855
[45] Date of Patent: Jun. 25, 1996

[54] REPLICATING A DATABASE BY THE SEQUENTIAL APPLICATION OF HIERARCHICALLY SORTED LOG RECORDS

[75] Inventors: Shinji Satoh, Chiba; Yuji Takase, Tama, both of Japan

[73] Assignee: International Business Machines Corporation, Armonk, N.Y.

[21] Appl. No.: 959,849

[22] Filed: Oct. 13, 1992

[51] Int. Cl.$^6$ .................................................. G06F 17/30
[52] U.S. Cl. .................... 395/600; 395/650; 395/700; 395/182.05; 395/182.14; 395/575; 364/DIG. 2; 364/943.91; 364/944.2; 364/970.1
[58] Field of Search ................................ 395/600, 575, 395/650, 700, 800, 182.05, 182.14

[56] References Cited

U.S. PATENT DOCUMENTS

| | | | |
|---|---|---|---|
| 4,357,635 | 11/1982 | Hasegawa | 360/51 |
| 4,853,843 | 8/1989 | Ecklund | 395/600 |
| 4,945,474 | 7/1990 | Elliot et al. | 395/575 |
| 5,043,866 | 8/1991 | Myre, Jr. et al. | 395/600 |
| 5,155,678 | 10/1992 | Fukumoto et al. | 395/425 |
| 5,170,480 | 12/1992 | Mohan et al. | 395/600 |
| 5,274,803 | 12/1993 | Dubin et al. | 395/600 |
| 5,280,611 | 1/1994 | Mohan et al. | 395/600 |
| 5,369,757 | 11/1994 | Spiro et al. | 395/575 |

OTHER PUBLICATIONS

Zarek, Bob, "Helping Server Faided", *Data Based Advisor*, vol. V9, Issue: M10, Oct., 1991, pp. 90–93.
Schaffhauser, Dian, "Managing Very Large Databases", *Data Based Advisor*, vol. V9, Issue: No.: N11, Nov. 1991, pp. 112–120.

*Primary Examiner*—Paul V. Kulik
*Assistant Examiner*—Paul R. Lintz
*Attorney, Agent, or Firm*—Sterne, Kessler, Goldstein & Fox

[57] ABSTRACT

A method and system are provided for continuously maintaining replicas of an active database in a backup system for disaster recovery purposes. Redo records transmitted from an active system are received into a dataspace work area in a backup system memory. Redo records in the work area for an uncommitted database transaction are grouped together. When a transaction becomes a committed transaction, the redo records for the transaction are sorted with redo records from other committed transactions according to database, block number within a database, offset location within a block, and sequence of occurrence. A plurality of update blocks from a backup database are read into a buffer in the backup system memory. The sorted redo records are sequentially applied to corresponding data records in the update blocks. The update blocks are then immediately written back to the database.

10 Claims, 10 Drawing Sheets

REPLICATING A DATABASE BY THE SEQUENTIAL APPLICATION OF HIERARCHICALLY SORTED LOG RECORDS

TECHNICAL DESCRIPTION

This invention relates to computerized transaction processing, and more particularly relates to updating a database using log records of database transactions.

BACKGROUND OF THE INVENTION

Computerized databases are used in many enterprises to maintain accurate and consistent data while enabling easy retrieval and modification of that data. The data is stored electronically in records on data storage devices such as a disk or other direct access storage device (DASD) attached to a computer system. The computer system has memory and a central processing unit (CPU) which runs database management system (DBMS) software.

The DBMS manages access to and processing of the database. The database can be accessed to retrieve data or to update data through a series of commands issued by a database user. The DBMS processes each command entered by a user as a separate "transaction". A single update transaction typically consists of a number of changes to be made to a series of database records (for example, updating new manager information for each employee of a manager). When all of the changes have been successfully made to the database records, the transaction is considered to be "committed". Records of each change to be made to database records can be recorded in a log which can be used to reproduce or recover the database in the event of a system or media failure. The log can be stored on an auxiliary storage device such as DASD or tape.

Enterprises that rely on computerized databases require continuity of service in the event of a system failure. Because computer systems are susceptible to hardware and software failure which can impair access to the data, there is a need to ensure that update transactions being processed when a failure occurs are accurately recorded.

Database media recovery processing includes the well-known forward recovery process in which a database unit is reconstructed by updating an earlier version with recovery data recorded in a log. A copy of the original version of the database unit is saved in stable storage. When a failure destroys the current copy of the database, the last current version of the database unit is reconstructed by restoring the saved version and then applying the log changes to the saved version in the same order in which they were made to the lost version.

A replica of a database can be stored at a remote location in order to reduce the chances of both systems being down at the same time due to a disaster at one of the sites. Use of forward asynchronous recovery in distributed database mirrors the original transaction processing. Changes to the primary database are logged and applied in the same sequence in which they occurred.

Many DBMSs are based on a hierarchical approach to database management. One such system is the IMS software product from IBM. The Fast Path feature of IMS is particularly well-suited for "on-line systems" driven by commands entered directly by end users such as bank tellers. These systems involve a high volume of commands being issued to the database that need to be processed quickly. A Fast Path database can be subdivided into 240 independent areas corresponding to an area of a disk on which the database is stored. One disk can correspond to one area.

In order to economize on memory requirements, the Fast Path system does not have what is called a look-aside database buffer pool which is used in many other IMS databases. A look-aside buffer is an area of the computer memory where data transferred from the external storage device can be kept temporarily so that it can be accessed more quickly during database searches. One or more pages of memory stay in the buffer for extended periods of time and subsequent changes to records in those pages are made directly to the buffer without writing the changes to the stable storage. Eventually, the pages of memory are returned to the corresponding storage sector in the stable storage. A buffer handler using a look-aside facility reduces its I/O requirements. However, the shared buffer pool has a disadvantage in terms of space utilization efficiency, particularly, in cases where the updated portion is very short compared with the database block.

Another difference of the Fast Path database from other IMS databases is that it does not log both a before image of a database record to be updated (called an "undo" record) and an after image of the changes to be made to the database as part of a transaction (called a "redo" record). This is done in order to increase efficiency when processing user commands. When using undo records, the DBMS writes the redo records as received. If a transaction is not committed, the DBMS uses the undo records to rewrite the record back to the way the record was before it had been changed (as saved by the undo record). The Fast Path system does not need to save undo records, since, it only writes the redo records at commit time, and then writes all changes to the disk.

Restart processing for the Fast Path database consists of using redo log records to finish database disk writes that did not occur because of the failure.

In order to ensure consistency between a Fast Path database and its replica, processing of the primary database should be reflected in the replica database. Throughput for application of record processing to the replica should be at least as good as that achieved by the transaction processing system for the primary database. Resource consumption at the replica processing must be low relative to the consumption of the transaction processing system as a whole. Serialization is needed to ensure that the database is transaction consistent with and identical to the primary database. Availability to the primary database cannot be reduced by the addition of transaction processing for the replica. Therefore, the I/O operations for writing changes to the backup databases must be made efficiently.

There are problems with replicating databases due to the need for providing availability to the active sites and with performance where a significant number of messages must be exchanged for each transaction. There is a high cost in terms of memory and time requirements associated with database serialization techniques such as locking for handling the processing of the records used to replicate the active databases. Therefore, it is advantageous to avoid using serialization techniques while maintaining the integrity of the databases. Additionally, efficiency in I/O operations are particularly important for a backup system which does not use a look-aside buffer.

In U.S. Pat. No. 5,170,480, issued 8 Dec. 1992 and assigned to the assignee of this patent application, change processing of a replica database is accomplished by separating redo records obtained from the transaction log of a primary database into respective queues. The redo records are separated such that all transaction records for a unit of transfer of the primary database are placed on the same queue in log sequence. The redo records are distributed onto the queue based on a hashing function which randomly assigns the redo records onto queues.

The database replication method is particularly well-suited for a database system that uses a "look-aside buffer", where data from the disk storage device is kept for significant periods of time and repeatedly changes are made to the data in the buffer without writing the changes to the disk. Because the Fast Path database system does not have a look-aside buffer, it is more important for that system to be efficient with I/O operations when updating the database.

SUMMARY OF THE INVENTION

The invention pertains to a transaction processing system including at least one active computer system in communication with a backup computer system, each computer system having a processor (CPU), memory, and at least one data storage device. A database is stored as a plurality of data records organized by offset location within blocks in the storage device. Redo log records represent changes to be made to a database as part of a database transaction when the database transaction is committed.

In one form of the invention a computer implemented tracking method updates the backup database to make it consistent with the active database in the transaction processing system. Redo records transmitted from the active system are received into a dataspace work area in the backup system memory. Redo records for an uncommitted database transaction are grouped together separate from redo records from other uncommitted transactions and redo records from committed transactions.

When a transaction becomes a committed transaction, the redo records for the committed transaction are sorted with redo records from other committed transactions in the work area according to database, block number within a database, offset location within a block, and sequence of occurrence. A plurality of update blocks from a backup database are read into a buffer in the backup system memory. Sorted committed redo records are sequentially applied to corresponding data records in the update blocks. The update blocks are immediately written back to the database after the committed sorted redo records for the update blocks have been applied to the corresponding data records in the update blocks.

In another form of the invention, a computer system updates a backup database to make it consistent with the active database. Log record processor means are provided for grouping separately in the backup computer memory, redo records for a single transaction in sequence of occurrence until the transaction is committed. Sorting means are provided for sorting committed redo records according to database, block number within a database, and offset in a block, in sequence of occurrence. I/O handler means are provided for reading a plurality of update blocks from a database into a buffer in the backup system memory and for writing the update blocks back to the storage device. Means are also provided for applying committed redo records to the update blocks.

In another form of the invention, a transaction processing system includes a database stored in a data storage device and a log for the database stored in auxiliary storage device containing a sequence of records including redo records representing changes to be made to the database as part of a transaction and a commit record indicating that a transaction is committed. A tracking system updates the database using the redo records. The tracking system comprises: record processor means for storing committed redo records in sequence of occurrence until a commit record is received for the transaction; log accumulator means for storing a plurality of sorted redo records for committed transactions; means for periodically sequentially reading a plurality of blocks from a database into a buffer; means for sequentially applying the sorted redo records to the blocks in the buffer; and means for writing the blocks back to the storage device. The sorted redo records are redo records sorted according to database, block number in the database, offset location within the block and sequence of occurrence.

DETAILED DESCRIPTION OF THE INVENTION

Figure 1:
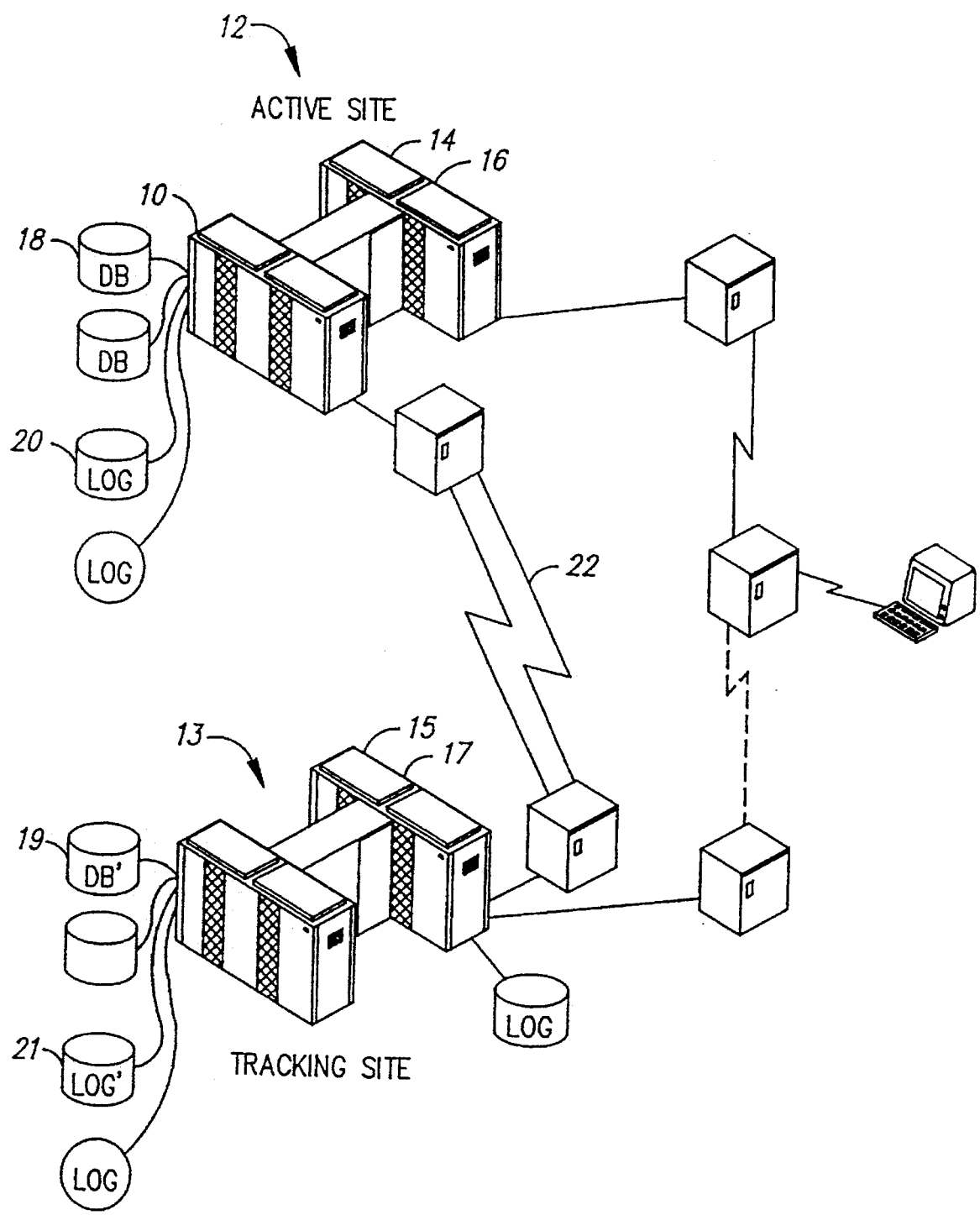
FIG. 1 is an overview of an active and backup database system.

Referring to FIG. 1, an active computer system 12 and a backup computer system (also called a tracking or shadow system) 13, each has, respectively, a processor (CPU) 14, 15, memory 16, 17, one or more data storage devices 18, 19 such as direct access storage device (DASD) and one or more auxiliary storage devices 20, 21 such as DASD or a tape.

One or more databases are stored in the storage devices 18. Each time a database is accessed, a record of that access is recorded as a log record. The records of every transaction to the databases are kept in one or more logs stored on the auxiliary storage device 20. Database Management System (DBMS) software is run by the computer system 12 to manage access to the database.

In the event of a system failure, data disk writes may have been interrupted and not properly recorded. Recovery processing requires the maintenance of a transaction log in stable storage. The transaction log records every transaction in the form of a series of log records.

Networking capabilities 22, such as the VTAM communication product from IBM, allows the active site 12 to be in communication with the backup site 13 that can be located at a remote location. The active DBMS ships log records as the records are created during transaction processing to a backup DBMS run by the backup system 13. The log records are stored in the backup auxiliary storage device 21. These log records are used to update a backup or shadow database stored in the backup system storage device 19. The tracking backup system runs twice as fast as the active system.

The IMS Fast Path database system from IBM is used for describing the preferred embodiment of the invention for efficiently processing log records for replicating a database. Although the Fast Path system is used as a basis for describing the preferred embodiment, the invention is not limited to use with that system. The method and system can be used with other systems as is well known to those skilled in the art. Furthermore, the system and method are not limited to processing redo records for maintaining a backup database consistent with an active database. For example, the system and method can also be used to recover databases from a system failure using redo log records.

The Fast Path DBMS uses redo log records to provide a copy of a change to be made to a database record as a result of an update transaction. Successful completion of a transaction is indicated by a commit operation which is recorded by a commit record in the log. If the transaction is abnormally terminated after the record is changed, an abort record is entered into the log. The DBMS writes redo log records at commit time, then writes all changes to the database disk. Restart processing following a system failure consists of using the redo log records to finish database disk writes. The recovery process keeps track of transaction boundaries and associate redo records.

The backup Fast Path DBMS uses the redo records from the log data received from the active system to maintain backup or shadow copies of the active system's databases. The databases being managed are stored in stable storage 19 in units of transfer. A unit of transfer is the basic unit which the manager will bring out of stable storage for I/O processing.

The MVS operating system on which IMS runs, writes blocks of data to disk storage. Access methods group multiple records (where each record is comprised of bytes of data) into blocks. Each record has an offset value within a block of where the record is stored. The records are referred to as LRECLs and CIs. A CI is a VSAM (virtual storage access method) control interval. There are a number of ways to address data stored on DASD. Relative Byte Address (RBA) and relative block number (RBN, CI number) are used by the IMS DBMS and VSAM.

Figure 2:
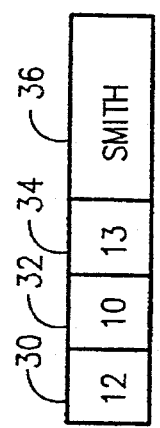
FIG. 2 is a diagram of a redo log record.

Referring to FIG. 2, a redo record has a field indicating a database 30, a field indicating a block number 32, a field indicating an offset location within a block 34, and a field with the actual update data 36, such as a new employee manager name for an employee database.

Figure 3:
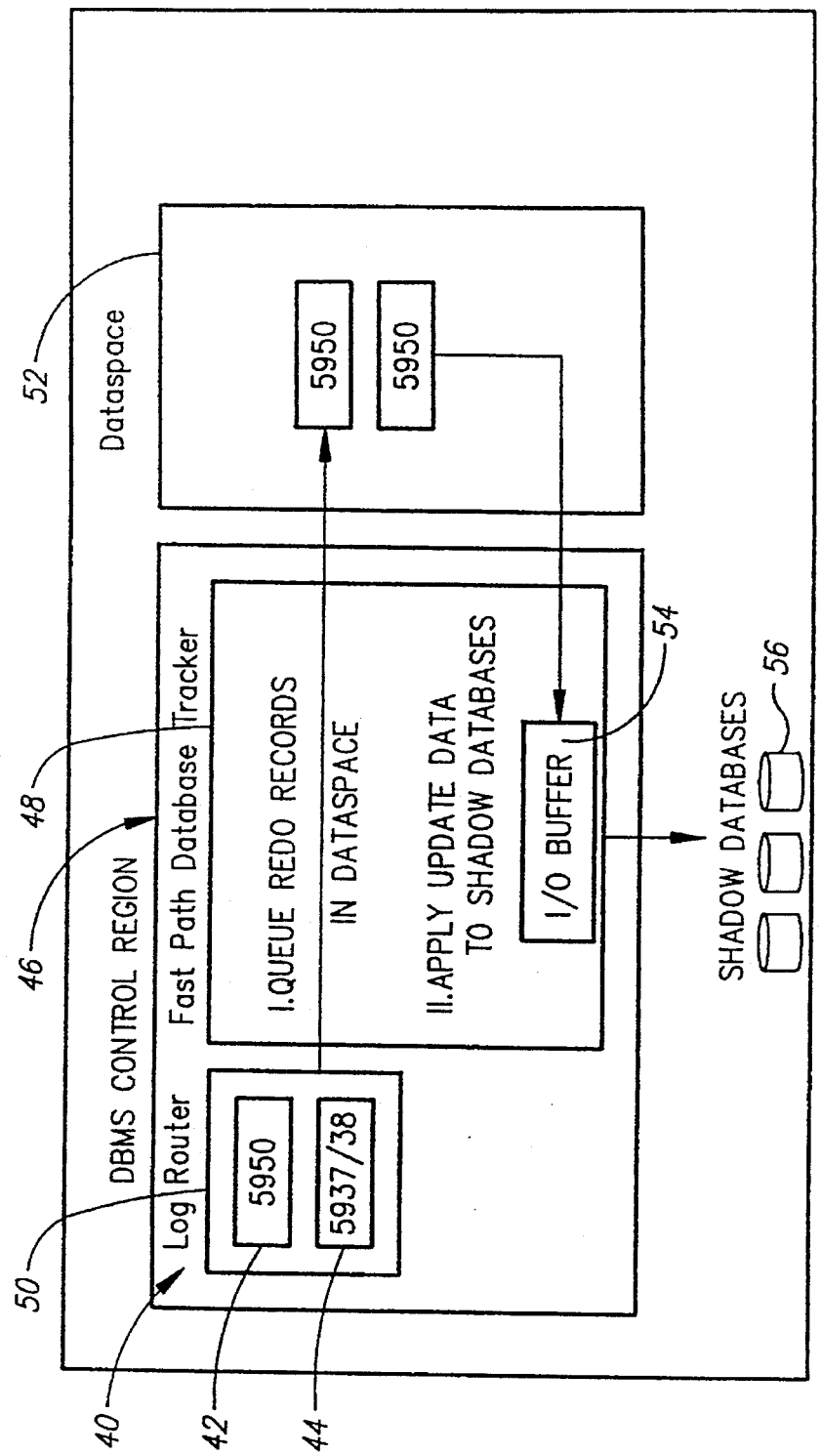
FIG. 3 is a block diagram of a system for applying log records to a remote database.

Referring to FIG. 3, an overview is shown of an implementation of a system for maintaining a backup database of an active database using log records. Log records 40, including redo log records (referred to as 5950 in FIG. 3) 42 and commit log records and abort log records (referred to as 5937/38 in FIG. 3) 44 are received in the DBMS control region of the backup system 46 from the active system. A database tracker 48 component, which is a series of operating command routines, receives log records from a database router 50 and queues the redo log records in an area of the backup system memory which is outside the DBMS control region, referred to as dataspace 52. The database tracker 48 also applies the stored redo log records to backup databases to support shadowing of the databases.

The redo records are copied to dataspace by the log router 50 run under a single thread to maintain the log record sequence using an MVS operating system control block TCB. The redo records are transferred from the log router component chronologically. The log router 50 operates asynchronously and does not wait for the log records to be processed.

The redo records are stored in dataspace until enough records have been accumulated to warrant writing the changes to the disk. A temporary I/O buffer 54 is used to write the update data to the shadow databases 56. While the redo records are stored in dataspace, the database tracker 48 sorts the redo records for efficient I/O operations. The tracker 48 also ensures that the redo records from aborted transactions are not recorded to the disk.

There are basically two stages of redo records processing performed by the database tracker 48. First, the redo records are queued in dataspace to avoid making the log router wait. The redo records are saved in the temporary queue until a commit or abort log record appears. When a commit record is received and identified by the tracker, the associated redo records are queued for accumulation processing on an area basis. The redo records are accumulated until I/O processing is triggered by a milestone. During accumulation processing, the redo records are sorted in relative disk space order, retaining log sequence for records that change the same block. The second stage of redo record processing is to apply update data to the backup shadow databases. The accumulation and sorting of the redo records by the tracker 48 reduces the number of I/O operations for the backup databases which improves overall database performance while maintaining a backup database.

There are a number of component subroutines of the tracker 48: a record processor, a log accumulator, an I/O handler, a queue server, an initialization process, and a milestone control process for triggering I/O operations.

During the initialization process, control blocks are created, the data tracker modules are loaded, the dataspace is created that is used to store the redo records, and a number of other initialization processes are implemented.

There are three modules used for initialization. The first module is used directly by the log router initialization to create and initialize control blocks and load the tracker modules in extended private storage area called E-Private area (a 31 bit addressable private storage controlled by the MVS/ESA operating system). Also during initialization, a queue server internal task (ITASK) control block asynchronous work element (AWE) is created and the dataspace storage manager is loaded. An ITASK is an internal work unit in IMS. An AWE is an asynchronous work unit describing a request. The dataspace is created and initialized by issuing the commands DPSERV and ALESERVE (which are MVS operating system services for data space management), and by calling a programming module. Also during initialization, a milestone index used for triggering I/O operations is initialized and the tracking log routing table address is returned.

The second initialization module is called by the Fast Path initialization. The second module allocates I/O buffers and data management header record control blocks (DMHRs), and creates a control block AWE Queue Server ITASK, a Tracking ITASK, an I/O Thread ITASK, and SRBs (used by the MVS operating system) for the I/O Thread ITASK.

The third module is also called by the Fast Path initialization and creates EMACs, a hash table for the EMACs and TURs, and issues messages. An EMAC is a tracking area control block which reports state information. The TUR is a control block structure that represents a unit of recovery for log records of the same recovery token (and will be described in greater detail below).

There are two queue servers used by the tracker. The first runs under the log routing TCB control block and serializes the process sequence of incoming log records. It serves AWEs from a designated queue header until a TERMINATE AWE is received. The second queue server serves AWEs from a second queue header until a terminate AWE is received and is used to ensure that the log router does not wait. The terminating AWE is scheduled by log record processors when a request requires I/O operations.

The milestone control process component for triggering I/O operations determines when to perform an I/O operation. A milestone is a snapshot of routing and tracking states at regular time and volume intervals.

There are three sets of sub-routines that are run by the tracker system 48 to organize the redo log records for efficiently writing updates of records to a database. The first routine run by the tracker is a log record processor which is called by the log router and runs under a single thread. The log record processor processes redo, commit and abort records. The redo records received from the log router for each uncommitted transaction are saved separately in dataspace until a commit or abort record is received for the transaction. The second routine is a log accumulator which sorts and accumulates committed redo records in dataspace. The third routine is an I/O handler which is available for each database and is invoked by a milestone. The I/O handler reads blocks of a database from a disk into a temporary I/O buffer and applies update data from the redo records to the corresponding records in the buffer update blocks, and then writes the blocks back to the shadow databases.

The process of organizing the redo records for writing to the backup disks (using the record processor, accumulator, and I/O handler) used by the tracker is explained in greater detail with reference to FIGS. 4–11.

Figure 4:
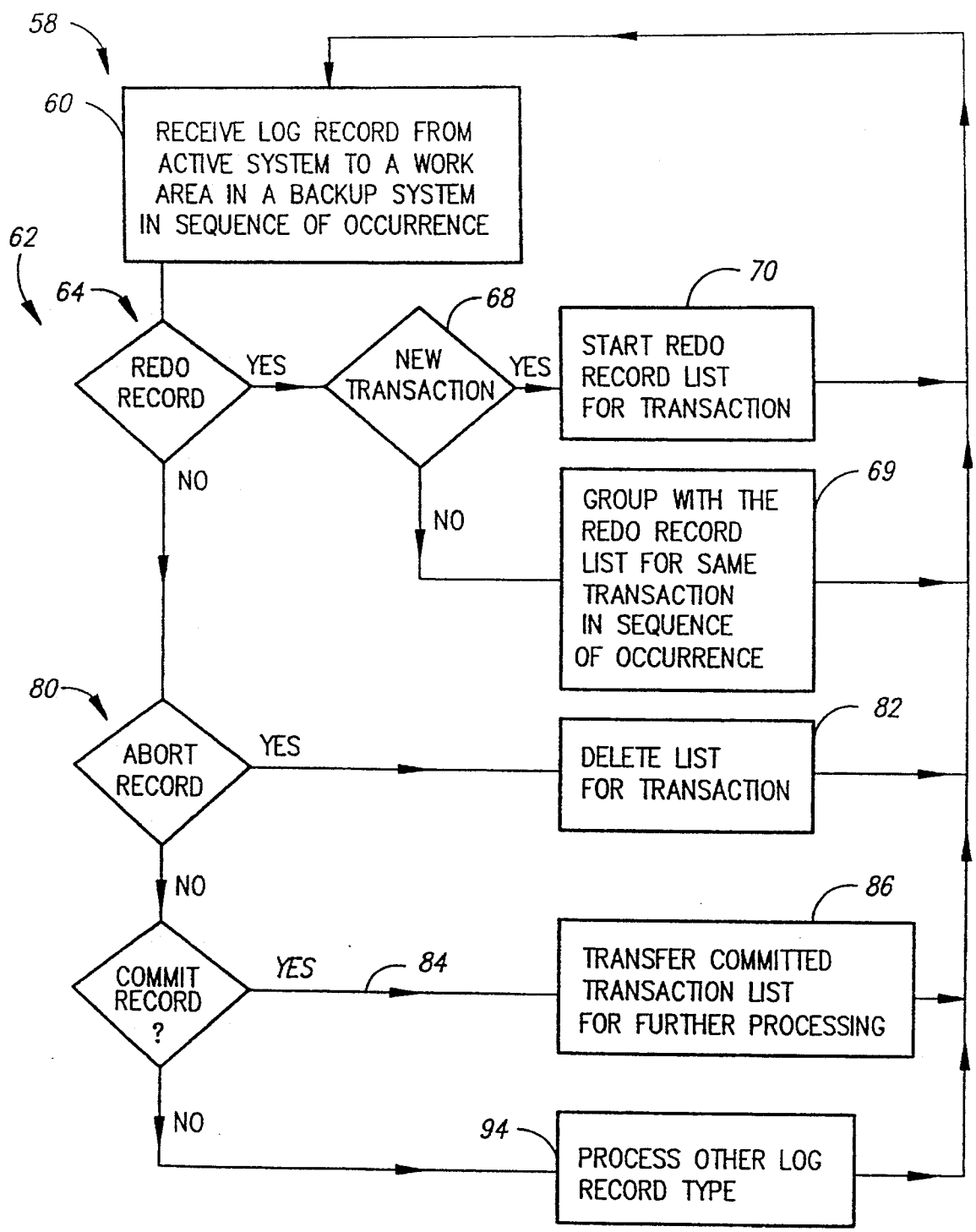
FIG. 4 is a flowchart for processing redo log records for a transaction not indicated as committed.
Figure 5:
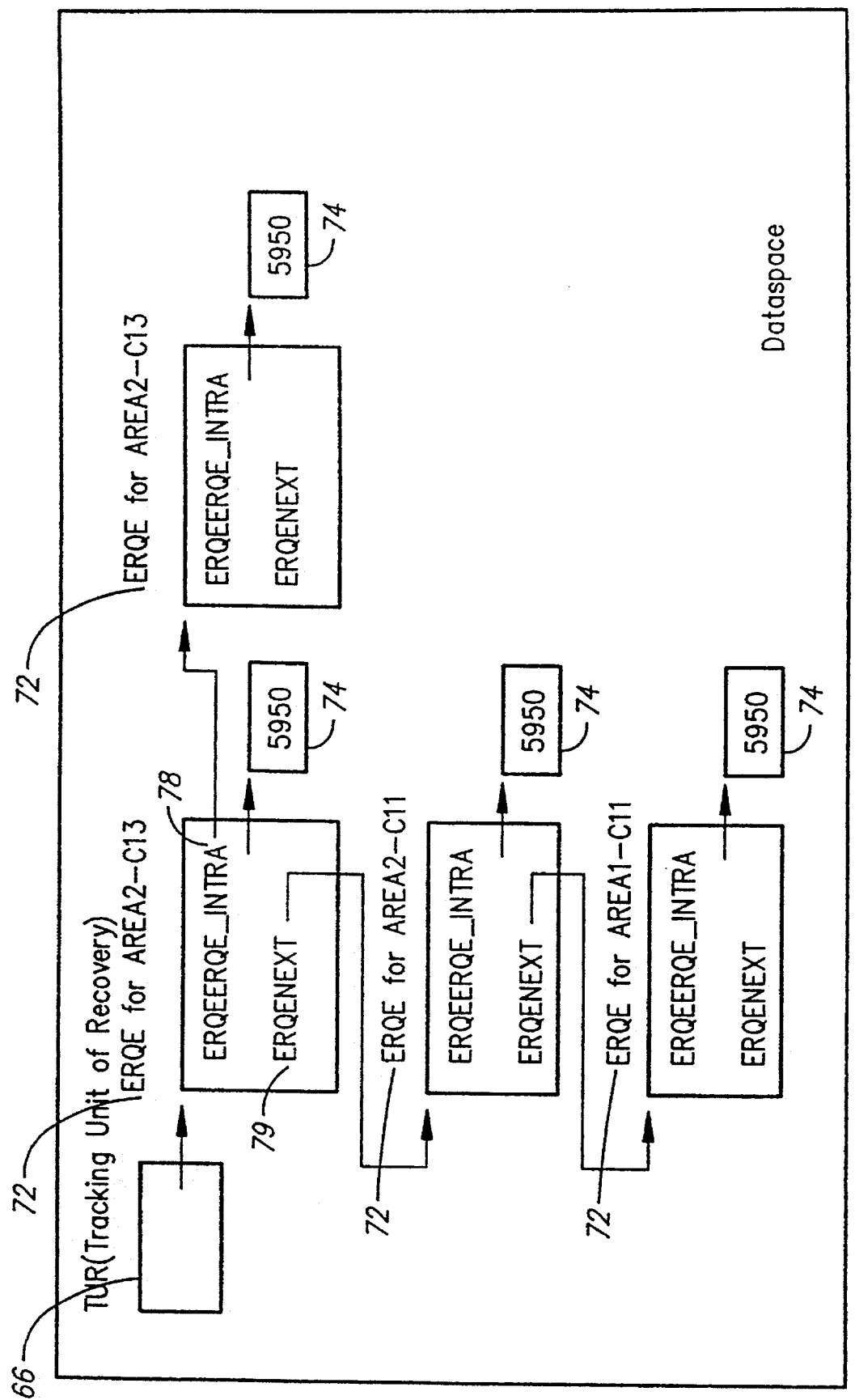
FIG. 5 is a block diagram of the processing of redo log records for a transaction not indicated as committed.
Figure 6:
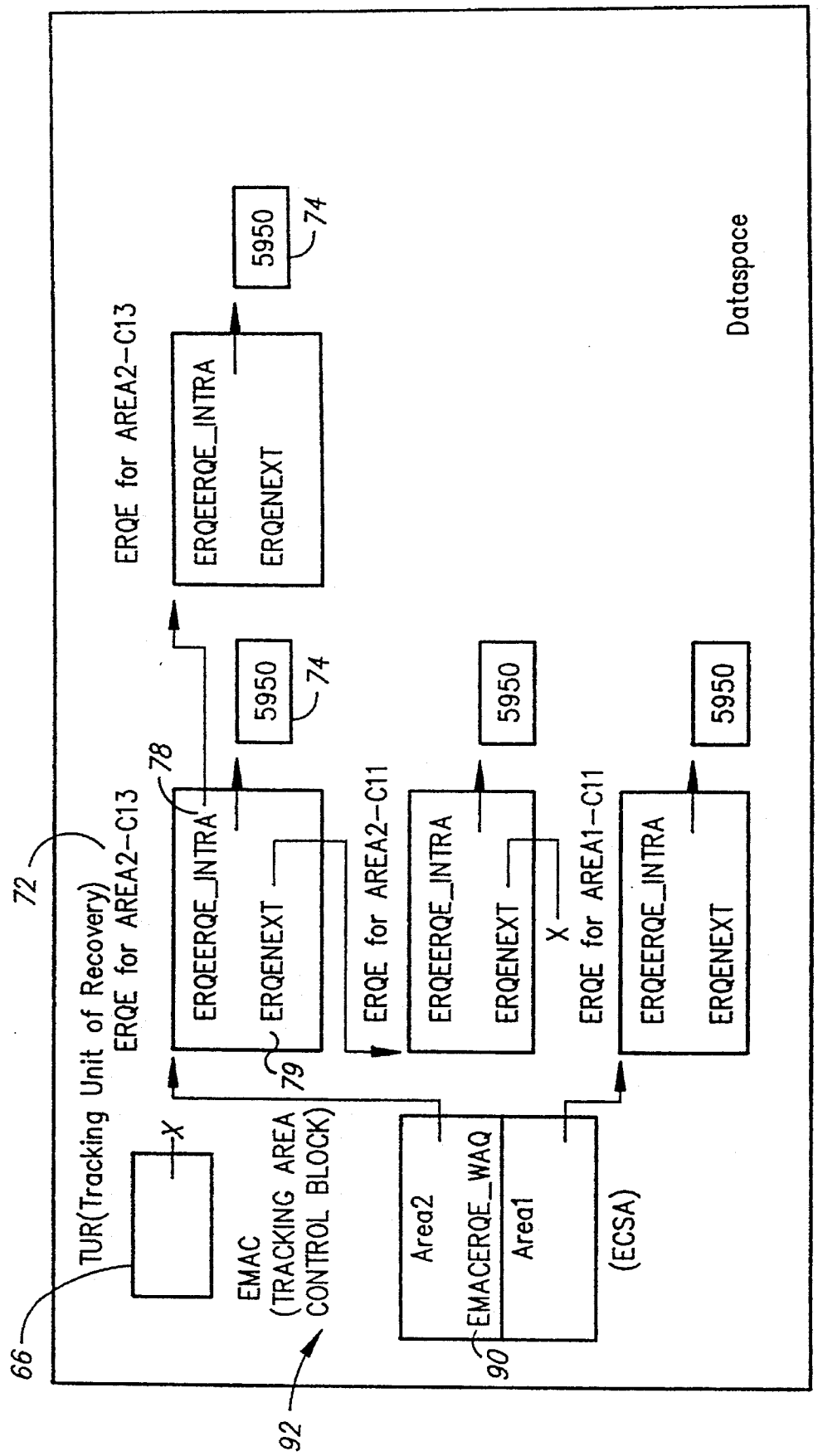
FIG. 6 is a block diagram of redo log records for a committed transaction.

Referring to FIGS. 4–6, a detailed explanation of the log record processor 58 is shown for processing log records received from the log router 50.

Referring to FIG. 4, the log record processor 58 processes log records and event notifications. The log records are presented by the log router to the appropriate tracking routine based on the record type using a log record routing table 62.

The redo record processor 64 is a routine of the log record processor that processes records which have not been committed, called "inflight" redo records. Redo records are after images of the data to be written to a database record as part of a transaction. In a Fast Path database, the redo records are not written to disk until a transaction is committed. Redo records for a transaction that is aborted are never written to the active database and consequently are not to be written to the backup databases.

The redo record processor 64 tries to find a tracking unit of recovery (TUR) (see 66 in FIG. 5) for the transaction 68. A TUR is a header for a list of the redo records for a transaction. As described previously, a TUR is a control block that represents a unit of recovery for log records of the same recovery token. If a TUR is found for the transaction, the redo record is grouped in the redo record list for the same transaction while maintaining the sequence of occurrence order 69. When the received redo record is the first redo record for a unit of recovery a TUR will not be found for the transaction, and a new TUR is created for the transaction dynamically in dataspace 70.

Referring to FIG. 5, the redo record processor creates a control block called a database redo queue element (ERQE) 72 in dataspace for each redo record 74. The ERQE 72 is chained from the respective TUR 66 for the transaction and the redo record 74 is chained from the ERQE 72. In that way, all redo records of one unit of recovery are chained and anchored from a TUR 66. In dataspace, 5950 redo log records 74 are represented by ERQEs 72.

ERQEs for the same database record in one transaction interval are chained by a control block pointer designated ERQEERQEINTRA 78 which includes a control block pointer designated ERQENEXT 79 which points to the next ERQE in the list. The redo log records chained from a TUR are treated as inflight, not yet committed or aborted, waiting for a commit or abort record processor's action.

The redo records for the same record will be handled by one I/O operation by the I/O handler. The number of I/O operations can thus be reduced when several redo records are for the same database, block within the database, and offset location within the block. Therefore, the organization of the redo records takes advantage of the fact that several redo records are frequently applied to the same database record since even one update call to one segment often creates several redo records by an active DBMS.

Referring to FIG. 4, another component of the log record processor is the commit/abort record processor 80. The commit/abort processor processes commit log records and abort log records. An abort log record for a transaction indicates that the transaction was aborted. The redo records received for that transaction were never written to the active database and should not be written to the backup databases. Therefore, when an abort log record is received, the TUR for the transaction is located and the redo log records and ERQEs for the TUR and the TUR are deleted 82.

When a commit log record is received 84, the TUR for the transaction is found and the corresponding redo records attached to the TUR are designated as committed and transferred to the control of the accumulator for further processing 86.

The process for transferring the committed redo records from the record processor to the accumulator is explained with reference to FIG. 6 which shows the redo records in the record processor when a commit log record has been received. Each ERQE 72 chained by an ERQENEXT 79 is verified as to whether it is to be applied. When the verification process by the tracking subsystem is completed successfully, the redo records 72 are designated committed. If the verification process fails, the ERQEs are deleted, otherwise, the ERQE 72 is rechained from the TUR 66 to a control block pointer designated EMACERQEWAQ 90 of a wait EMAC queue 92 for the log accumulator in a last in first out (LIFO) arrangement. The EMACERQEWAQ 90 serves as an anchor point for ERQEs 72 waiting for further processing (sorting and storage) by the log accumulator. The tracking area control block EMAC 92 is chained from the EDBTWAQ control block as a wait EMAC queue for the log accumulator. After the ERQEs are processed, the TUR 66 is deleted.

Whenever the log accumulator is busy processing other redo records and cannot process redo records from the record processor, the accumulator is in waiting mode designated as an IWAIT status. When the accumulator is in IWAIT status, it is notified that the newly committed redo records need processing by being issued an internal post called an IPOST, which lets an asynchronous requester know that a work item has completed.

Other log records such as commit-redo records, init/term records, end update records, and end active stream records are also processed by the log record processor 94.

A preferred embodiment of the accumulator 98 can be described with reference to FIGS. 7 through 9. The log accumulator is an intermediate function positioned between the log processor and the I/O handler. It improves the performance of the I/O processor by putting all redo records together for each database and arranging redo records in ascending order according to relative offsets in database blocks.

Figure 8:
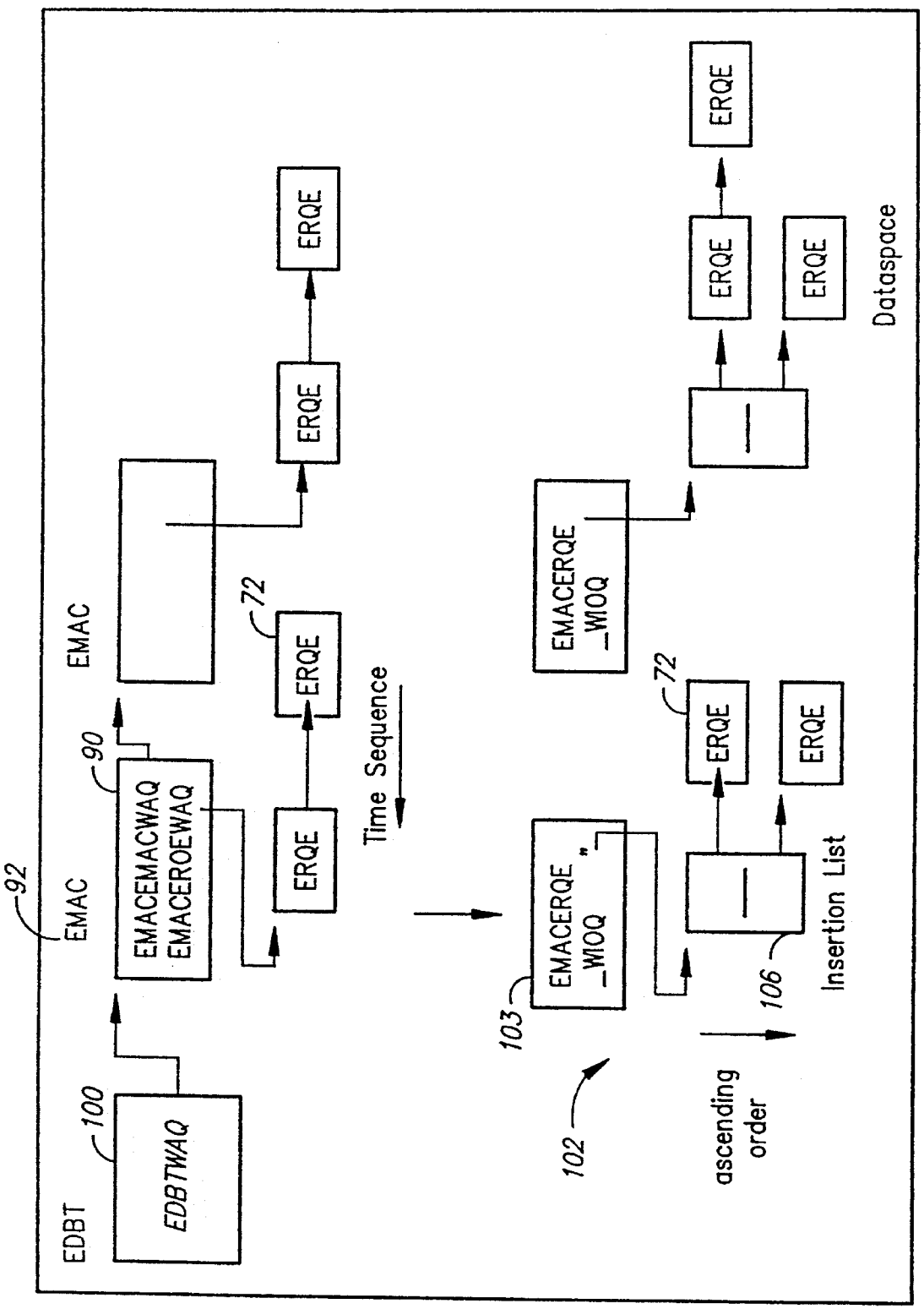
FIG. 8 is a block diagram of a redo log records in an accumulator.

Referring to FIG. 8, the control block anchor point designated EDBTWAQ 100 for the ERQEs 72 acts an input queue for the accumulator to find an "action needed" EMAC control block 94 for the log accumulator. Each ERQE 72 to be processed is chained from a control block designated EMACERQUEWAQ 90 in EMAC 92. The log accumulator sorts the ERQEs in ascending order according to offset within a block (referred to as the record block address or RBA) in order to improve the efficiency of the I/O operations.

To save pathlength when sorting the ERQEs, each EMAC 92 maintains an ERQE insertion list (EIL) 102 in a contiguous storage area from the header control block designated EMACERQEWIOQ 103. The entries 106 in the list 102 are the ERQE's relative offset within a block of a database (CI's RBA) and the corresponding address of where the actual ERQE 72 is stored in the dataspace work area. By using the EIL 102, the redo records do not have to be located to determine the corresponding record's offset address. This allows for easier searching when sorting the redo record.

Figure 7:
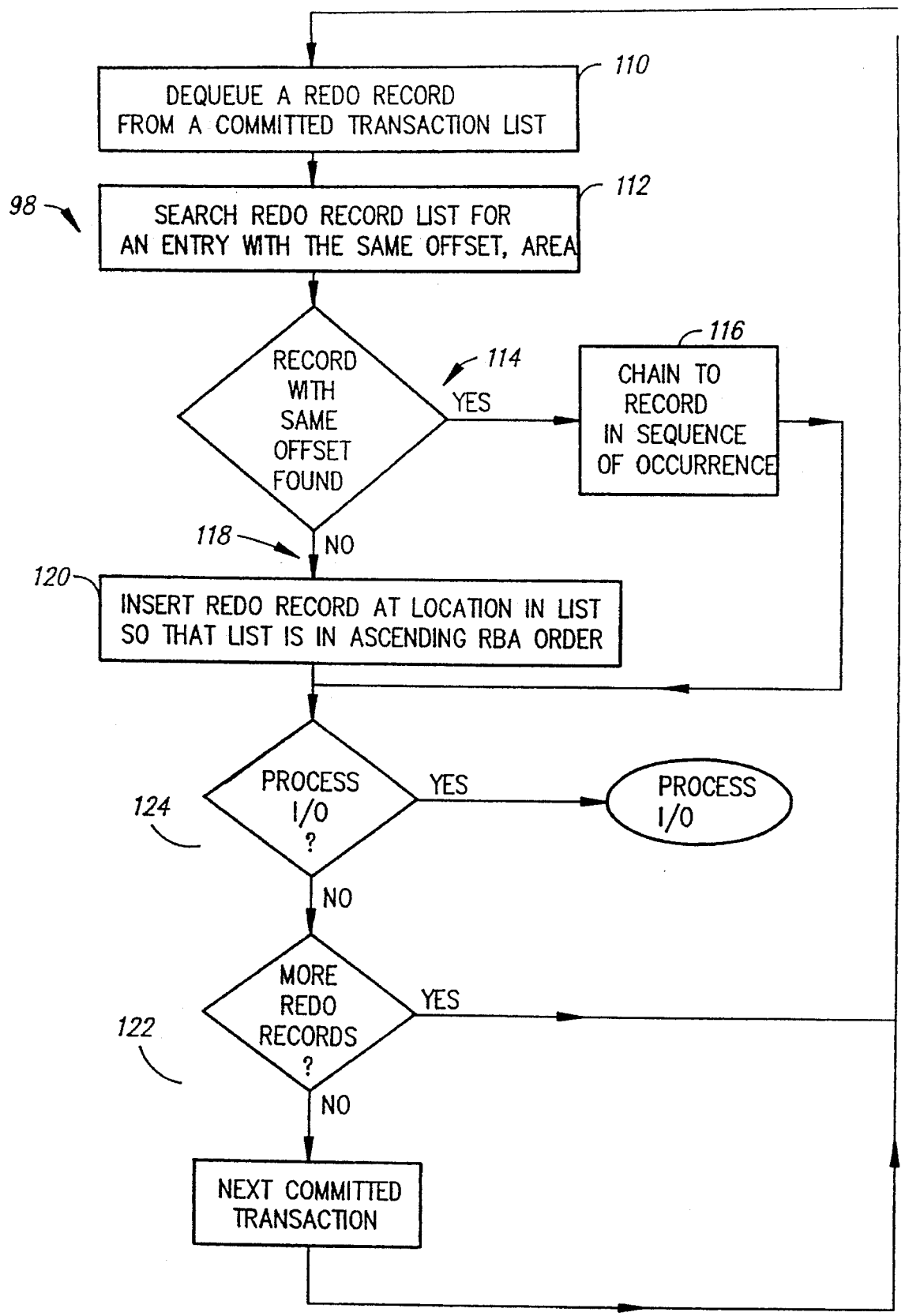
FIG. 7 is a flowchart for the processing of redo log records by the accumulator.

Referring to FIG. 7, the log accumulator dequeues an ERQE from the committed transaction list (designated by header EMACERQEWAQ) 110 and searches the EIL to find an entry which has the same offset as the ERQE to be inserted into the list in a sorted order 112. If a corresponding entry is found 114, the ERQE to be inserted is chained from the entry 116 in a last in first out (LIFO) order. If there is no entry with the same offset as the ERQE 118, a new entry is created for the ERQE in an appropriate location in the EIL 120 so that every entry is placed in ascending RBA order.

The arrangement of the entries in the EIL 102 requires that part of the entries have to be moved by the length of an entry (8 bytes). Contiguous storage for this list is created dynamically in dataspace when it is needed. The size of the EIL is 16K bytes so that one EIL can have 2000 entries in it. When an EIL is filled up with entries, another EIL is created by the log accumulator which chains it from the EIL header (designated EMACERQEWIOQ 103) in a LIFO arrangement. The EIL can be searched for the appropriate redo record using a binary search algorithm, well known to those skilled in the art, to improve performance.

ERQEs for redo records for the same database (CI) are chained by a pointer named ERQENEXT. These redo records can be handled by one I/O operation by the I/O handler. Thus, the number of I/Os will be reduced if several redo records beyond transaction intervals are for records stored in the same block in the same database at the same offset (have the same area name and RBA). Furthermore, whenever a redo record is processed that contains the full contents of a CI, the previous redo records for the CI are deleted because they are not needed for the I/O handler.

The accumulator 98 continues processing committed redo records for a transaction and subsequent transactions 122.

When an I/O milestone is reached for a database as indicated by the milestone component, the redo records for that database are written to the disk 124 by processing the I/O operations. When the log accumulator receives a message to end and clean up the work areas, referred to as a postcode of TRM, it returns control to a dispatcher after completing service for all redo data chained from the control block pointer EMACERQEWAQ.

Figure 9:
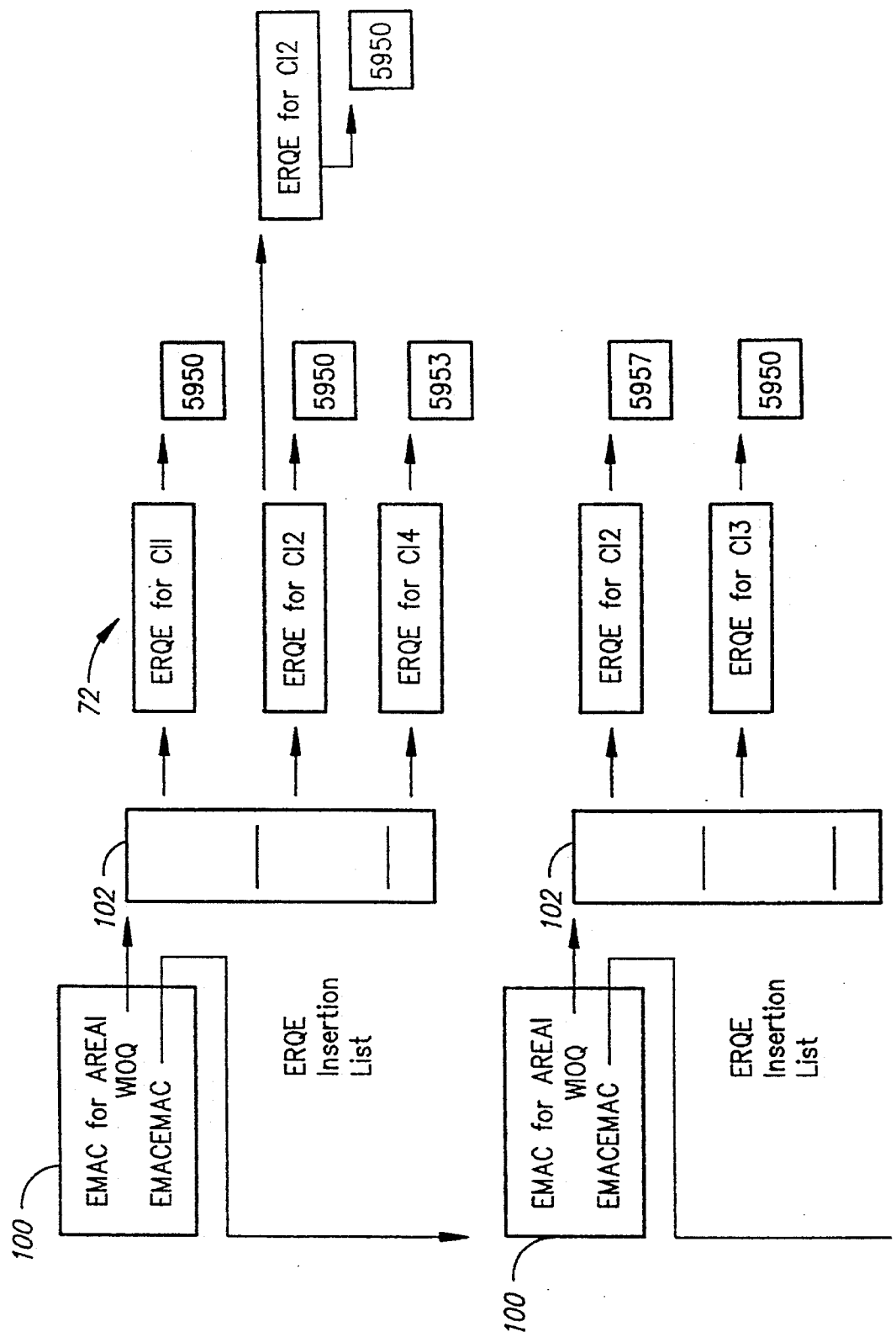
FIG. 9 is a block diagram of sorted redo log records stored in an accumulator.

FIG. 9 shows buffered data in dataspace at the beginning of a milestone trigger I/O process. The ERQEs 72 for the offsets within a block are all arranged in ascending RBA order for a tracking area recovery block (designated as EMAC) 100 for a database in an EIL 102.

Figure 10:
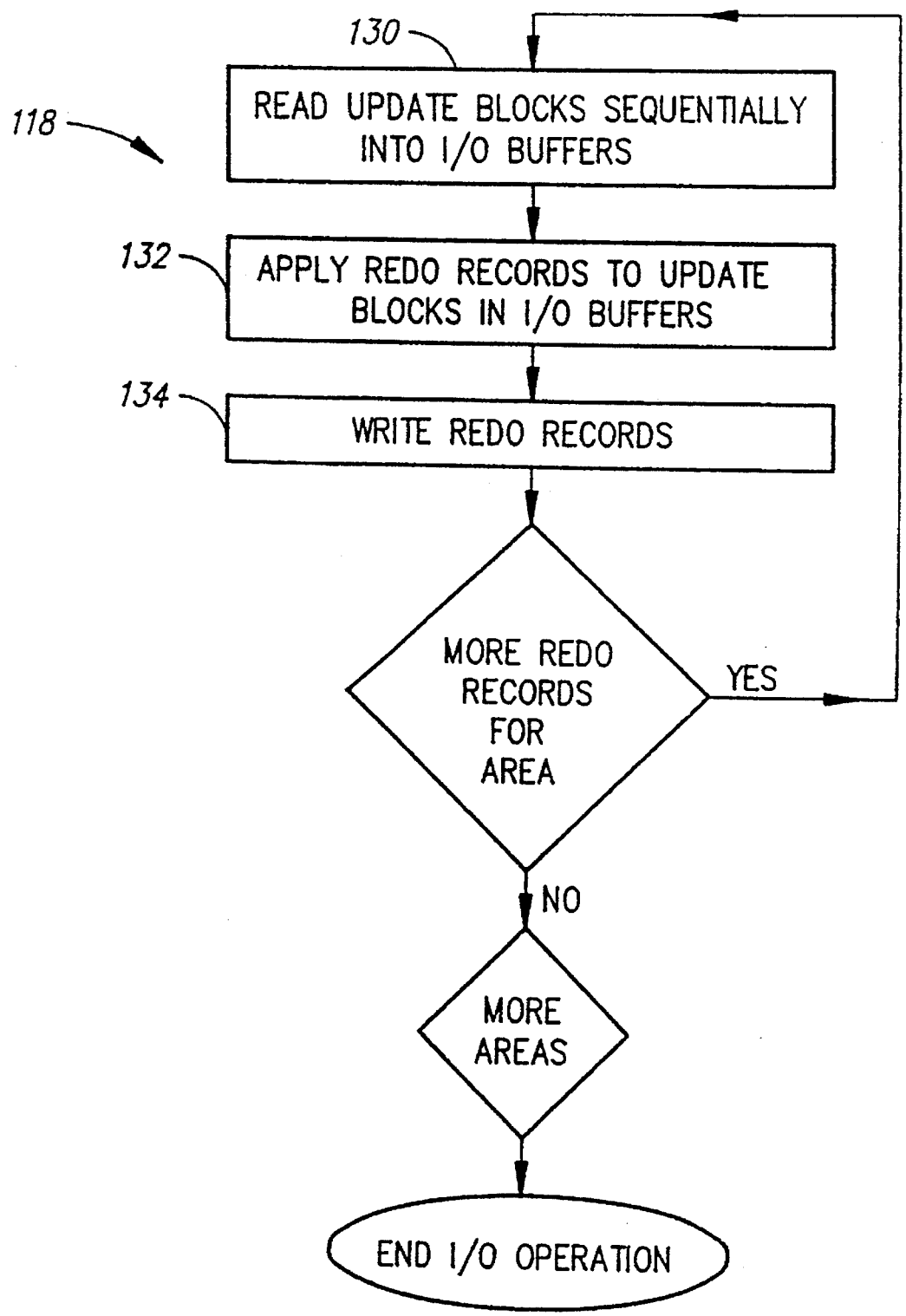
FIG. 10 is a flowchart of the process for writing redo log records to disk storage.
Figure 11:
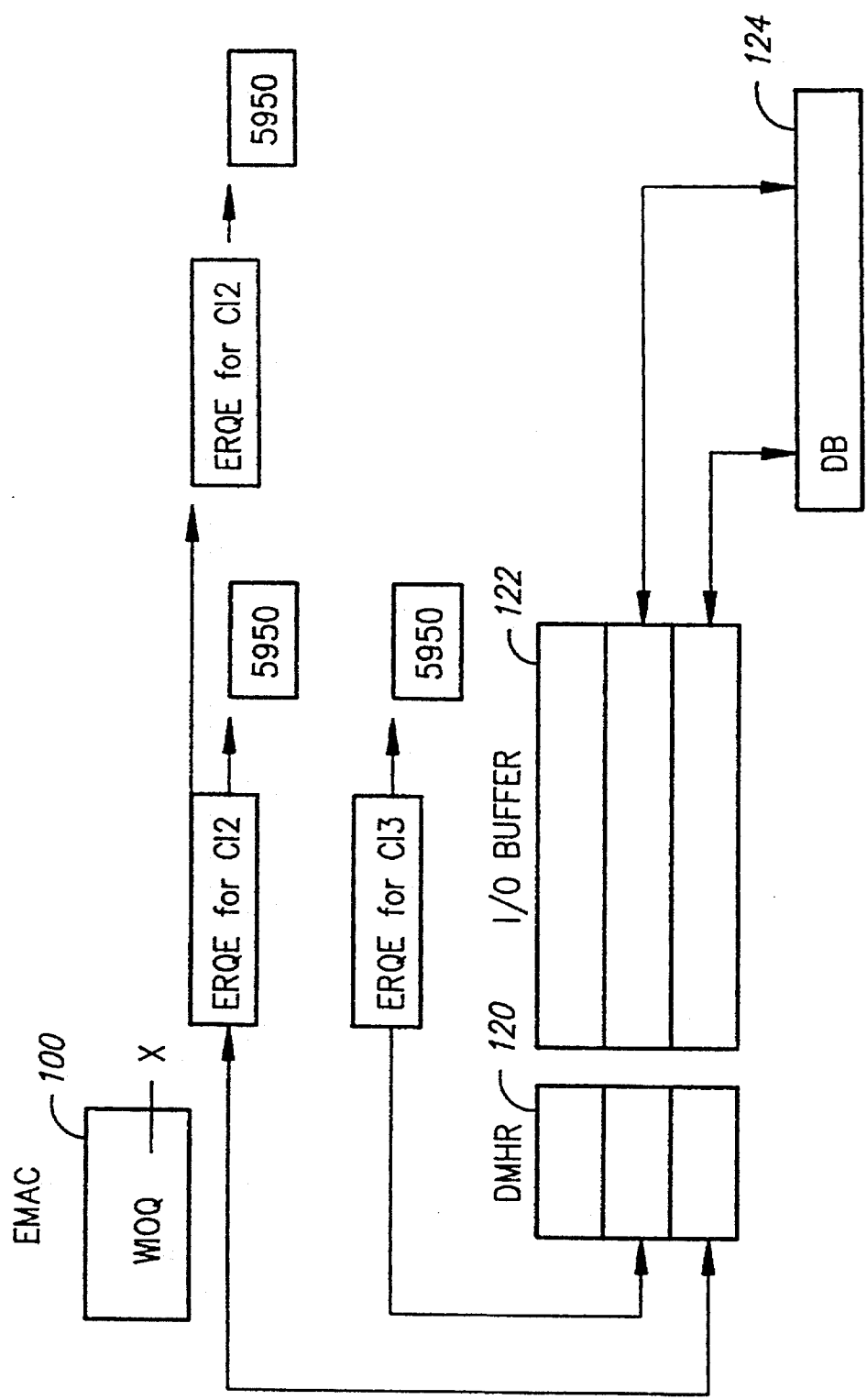
FIG. 11 is a block diagram of the process for writing redo log records to disk storage.

Referring to FIGS. 10 and 11, the preferred embodiment for the I/O handler routine 118 of the tracker is shown. Each shadow database has an I/O handler associated with it that is invoked intermittently. The I/O handler runs under a single I/O thread ITASK (designated as IOTI ITASK) and several tasks can run concurrently. The number of IOTI ITASKS internally posted to let asynchronous requests know a work item has been completed (IPOSTed) is calculated by "BEGIN MILESTONE" logic (by the milestone routine) to indicate the end of an interval for a milestone using load balancing techniques. The use of dynamic load balancing logic minimizes the cyclic impact of I/O processing.

The I/O handler is invoked by a "begin milestone" signal from the milestone control routine. The I/O process must be complete by the next milestone (end of a designated interval). When a milestone period starts it is expected that many redo records are in the dataspace, so that the I/O operations will be implemented with optimal efficiency.

When IPOSTed, I/O handlers looks for the EMAC 100 which has the EIL chained from the control block designated EMACERQEWIOQ. The EIL is reordered from last in first out (LIFO) to first in first out (FIFO) so the ERQEs are arranged in descending RBA order. Each entry of the EIL is processed to read the database blocks (CIs) to the I/O buffers. The database name (DBD name), block number (DSID) and offset (RBA) is read for each ERQE. This is set in the control block designated DMHR 120, which is the list of blocks to be read into the I/O buffers 122. The DMHR 120 is then set up for read requests. A read request is made by a backup shadow database from that location.

A module is called to issue a call by the MVS operating system scheduling function called SRB that causes several blocks of data from a database 124 to be read into the buffers (as many as the buffers allow) (130 in FIG. 10). The number of I/O buffers used is calculated as follows: N=DBBF / OTHR. Where N is the number of I/O buffers assigned to each IOTI. DBBF is the total number of I/O buffers (specified by DBBF=parm in EXEC parameter for the call to the routine); and OTHR is the number of IOTI TASKS (specified by OTHR=parm in EXEC parameter).

The redo records are applied to the I/O buffers 132 after reordering the ERQE's chain from LIFO to FIFO.

After redo records are applied to the update blocks in the buffers, the update buffers are written back to the database 134. When all the ERQE's are processed, AWE requests are processed for the database that have waited for the I/O completion. The I/O handler checks all the AWEs to perform the requested service for each.

The I/O handler then looks for another EMAC that needs processing. One EMAC is processed by one ITASK (designated as IOTI) so that no locking mechanism is needed. After a tracking area control block EMAC is processed, all EILs and ERQEs for the EMAC are deleted.

Whenever all EMACs are processed, the I/O handler goes into a waiting status called IWAIT. If it is the last IOTI ITASK, the milestone can be ended by issuing an IPOST end milestone.

When the I/O processing is triggered, a number of I/O processes are resumed. Each I/O process selects an area for processing, taking its sorted list of redo records and processing them all. The I/O processor performs the multiblock read to get the first series of blocks from which redo records exist. The redo changes are then applied to these blocks. Afterwards, a multiblock write is performed to write the disk block back to the stable storage. CPU consumption is minimized by using multiblock read/writes. With today's disks, the sort order of redo records give an efficient sweep across the disk when there is only one area per disk.

The accumulation of a large number of records before I/O ensures that intertransaction changes to the same disk block will be processed in one operation. However, the time in between writing to disk must be minimized or recovery time in the event of a disaster is adversely affected. This provides a space efficient buffer pool since storing a redo record consumes less space than storing a disk block. Additionally, the tracker system never makes the log router wait and runs at least twice as fast as the active database, which improves throughput for the backup system.

While we have described a preferred embodiment of our invention, it should be understood that modifications and adaptations thereof will occur to persons skilled in the art. Therefore, the protection afforded the invention should only be limited in accordance with the scope of the following claims.

We claim:

1. In a transaction processing system including at least one active computer system in communication with a backup computer system, the backup computer system having a processor (CPU), memory, and a data storage device having a backup database stored therein, each active computer system having a processor, memory, at least one data storage device having an active database stored as a plurality of data records organized by offset location within blocks in the active system storage device, and redo log records representing changes to be made to a database as part of a database transaction when the database transaction is committed, a computer implemented tracking method for updating the backup database to make it consistent with the active database, comprising the steps of:

a) receiving redo records transmitted from the active system into a dataspace work area in the backup system memory;

b) grouping redo records in the work area from an uncommitted database transaction together;

c) when a transaction becomes a committed transaction, sorting the redo records for the committed transaction with redo records for other committed transactions in the work area according to database, block number within a database, offset location within a block, and sequence of occurrence;

d) reading into a buffer in the backup system memory, a plurality of update blocks from the backup database;

e) sequentially applying sorted committed redo records to corresponding data records in the update blocks; and f) immediately writing the update blocks back to the backup database after the sorted committed redo records for the update blocks have been applied to the corresponding data records in the update blocks.

2. The method of claim 1 further comprising the step of: repeating steps (d) through (f) a plurality of times until all blocks of the database have been updated by the sorted committed redo records.

3. The method of claim 1, wherein a redo record comprises a field containing an identified database, a field containing an identified block number, a field containing an identified offset number, and a field containing update data, and wherein the step of applying redo records to the update blocks comprises changing data stored at identified offsets in identified database blocks to the update data from corresponding redo records.

4. The method of claim 1 further comprising transmitting the redo records from the active system in sequence of occurrence.

5. The method of claim 1 further comprising designating the transaction as committed in response to a commit log record being received by the backup system.

6. In a transaction processing system including at least one active computer system in communication with a backup computer system, the backup computer system having a processor (CPU), memory, and a data storage device having a backup database stored therein, each active computer system having a processor, memory, at least one data storage device having an active database stored as a plurality of records organized by offset location within blocks in the active system storage device, and redo log records representing changes to be made to a database as part of a database transaction when the database transaction is committed, a computerized tracking system for updating the backup database to make it consistent with the active database, comprising:

log record processor means, coupled to the backup computer memory, for grouping together in the backup computer memory, redo records for each separate transaction in sequence of occurrence until the transaction is committed;

sorting means, coupled to the backup computer memory, for sorting committed redo records for committed transactions according to a database name, a block number within a database, and an offset within a block, in sequence of occurrence;

means, coupled to the backup computer memory, for reading a plurality of update blocks from a database into a buffer in the backup computer memory;

means, coupled to the backup computer memory, for applying committed redo records to the update blocks; and means, coupled to the backup computer memory, for writing the update blocks back to the backup database.

7. The computerized tracking system of claim 6 further comprising means for receiving redo records and commit log records from the active system into the backup computer memory.

8. In a transaction processing system including a database stored in a data storage device and a log for recording database transactions stored in auxiliary storage device containing a sequence of records including redo records representing changes to be made to the database as part of a committed transaction and a commit record indicating that a transaction is a committed transaction, a system for updating the database comprising:

record processor means, coupled to a memory associated with said auxiliary storage device, for storing in said memory committed redo records in sequence of occurrence until a commit record is received for the transaction;

log accumulator means, coupled to said memory, for storing in said memory a plurality of sorted redo records for committed transactions, wherein sorted redo records are redo records sorted according to a database, a block number in a database, an offset location within a block and sequence of occurrence;

means, coupled to said memory, for periodically sequentially reading a plurality of update blocks from a database into a buffer in said memory;

means, coupled to said memory, for sequentially applying the sorted redo records to the update blocks in the buffer; and means, coupled to said memory, for writing the blocks back to the auxiliary storage device.

9. A system, comprising:

at least one active computer system comprising at least one active data storage device having an active database stored as a plurality of records organized by offset location within blocks in the active storage device;

a backup computer system, in communication with said active computer system, said backup computer system comprising a processor, a memory, at least one backup data storage device having a backup database stored as a plurality of records organized by offset location within blocks in the backup storage device, and redo log records representing changes to be made to a database as part of a database transaction when the database transaction is committed;

control means for enabling said processor to update the backup database to make it consistent with the active database, comprising:

log record processor means, coupled to the backup computer memory, for enabling said processor to group together in the backup computer memory, redo records for each separate transaction in sequence of occurrence until the transaction is committed;

sorting means, coupled to the backup computer memory, for enabling said processor to sort committed redo records for committed transactions according to a database name, a block number within a database, and an offset within a block, in sequence of occurrence;

means, coupled to the backup computer memory, for enabling said processor to read a plurality of update blocks from a database into a buffer in the backup computer memory;

means, coupled to the backup computer memory, for enabling said processor to apply committed redo records to the update blocks; and means, coupled to the backup computer memory, for enabling said processor to write the update blocks back to the database.

10. A controller for use in a system comprising at least one active computer system comprising at least one active data storage device having an active database stored as a plurality of records organized by offset location within blocks in the active storage device, the system also comprising a backup computer system, in communication with the active computer system, the backup computer system comprising a processor, a memory, at least one backup data storage device having a backup database stored as a plurality of records organized by offset location within blocks in the backup storage device, and redo log records representing changes to be made to a database as part of a database transaction when the database transaction is committed, the controller for enabling the processor to update the backup database to make it consistent with the active database, the controller comprising:

log record processor means, coupled to the backup computer memory, for enabling the processor to group together in the backup computer memory, redo records for each separate transaction in sequence of occurrence until the transaction is committed;

sorting means, coupled to the backup computer memory, for enabling the processor to sort committed redo records for committed transactions according to a database name, a block number within a database, and an offset within a block, in sequence of occurrence;

means, coupled to the backup computer memory, for enabling the processor to read a plurality of update blocks from a database into a buffer in the backup computer memory;

means, coupled to the backup computer memory, for enabling the processor to apply committed redo records to the update blocks; and means, coupled to the backup computer memory, for enabling the processor to write the update blocks back to the database.

* * * * *